(12) United States Patent
Zhao

(10) Patent No.: US 12,488,150 B2
(45) Date of Patent: Dec. 2, 2025

(54) METHOD FOR DATA COMMUNICATION AND ELECTRONIC DEVICE

(71) Applicants: BEIJING BOE TECHNOLOGY DEVELOPMENT CO., LTD., Beijing (CN); BOE TECHNOLOGY GROUP CO., LTD., Beijing (CN)

(72) Inventor: Junjie Zhao, Beijing (CN)

(73) Assignees: BEIJING BOE TECHNOLOGY DEVELOPMENT CO., LTD., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 232 days.

(21) Appl. No.: 18/246,802

(22) PCT Filed: Sep. 23, 2021

(86) PCT No.: PCT/CN2021/119875
§ 371 (c)(1),
(2) Date: Mar. 27, 2023

(87) PCT Pub. No.: WO2022/068665
PCT Pub. Date: Apr. 7, 2022

(65) Prior Publication Data
US 2023/0359774 A1   Nov. 9, 2023

(30) Foreign Application Priority Data
Sep. 30, 2020   (CN) .......................... 202011069670.0

(51) Int. Cl.
*G06F 21/64* (2013.01)
*G06F 21/60* (2013.01)
(52) U.S. Cl.
CPC ............ *G06F 21/64* (2013.01); *G06F 21/602* (2013.01)

(58) Field of Classification Search
CPC ........ G06F 21/64; G06F 21/602; G06F 16/27; G06F 21/60; G06Q 20/22; G06Q 20/38; G06Q 40/04; G06Q 20/382
See application file for complete search history.

(56) References Cited

U.S. PATENT DOCUMENTS

| | | | |
|---|---|---|---|
| 11,829,961 B1 * | 11/2023 | Wood | H04L 9/50 |
| 2015/0379510 A1 * | 12/2015 | Smith | G06F 21/64 |
| | | | 705/71 |

(Continued)

FOREIGN PATENT DOCUMENTS

| | | |
|---|---|---|
| CN | 108665261 A | 10/2018 |
| CN | 108681811 A | 10/2018 |

(Continued)

OTHER PUBLICATIONS

International Search Report and Written Opinion dated Dec. 22, 2021, for corresponding PCT Application No. PCT/CN2021/119875.

(Continued)

*Primary Examiner* — Michael R Vaughan
*Assistant Examiner* — Ethan V Vo
(74) *Attorney, Agent, or Firm* — Kinney & Lange, P.A.

(57) ABSTRACT

A method for data communication and an electronic device are provided. A method for data communication executed at an electronic device of a data transmitter includes: publishing a first contract to a blockchain network or signing a first contract published by a data receiver to the blockchain network, wherein the first contract includes a first method used to trigger transmission of data between a data transmitter signing the first contract and a data receiver signing the first contract, and a second method used to trigger determination of a value of the data; and transmitting the data to the data receiver according to the first contract.

19 Claims, 7 Drawing Sheets

(56) References Cited

U.S. PATENT DOCUMENTS

| | | | |
|---|---|---|---|
| 2018/0218176 A1* | 8/2018 | Voorhees | G06Q 20/02 |
| 2019/0378121 A1* | 12/2019 | Marshall | G06F 21/64 |
| 2020/0058023 A1* | 2/2020 | Travizano | H04L 9/3239 |
| 2020/0097460 A1* | 3/2020 | Keskar | H04L 9/50 |
| 2020/0234286 A1* | 7/2020 | Simlett | G06Q 20/065 |
| 2021/0124722 A1* | 4/2021 | Srivastava | G06Q 20/2295 |
| 2021/0176221 A1* | 6/2021 | Li | H04L 63/0457 |
| 2023/0034519 A1* | 2/2023 | Ahmed | H04L 9/50 |

FOREIGN PATENT DOCUMENTS

| | | |
|---|---|---|
| CN | 108985909 A | 12/2018 |
| CN | 109615431 A | 4/2019 |
| CN | 110210862 A | 9/2019 |
| CN | 110223064 A | 9/2019 |
| CN | 111324661 A | 6/2020 |
| CN | 111369234 A | 7/2020 |

OTHER PUBLICATIONS

First Office Action from Chinese Application No. 202011069670.0, Dated Apr. 30, 2024, 15 pages.

\* cited by examiner

700

A first contract is publishsed to a blockchain network or a first contract published by a data receiver to the blockchain network is signed, the first contract includes a first method of establishing a contract used to be invoked to trigger transmission of data between a data transmitter signing the first contract and a data receiver signing the first contract, and a second method used to trigger the determination of the price value update of the data or a second contract triggering method used to trigger the execution of the second contract, and the second contract includes a value calculating method used to determine the value of the data — S710

The data is transmitted to the data receiver according to the first contract — S720

FIG. 7

METHOD FOR DATA COMMUNICATION AND ELECTRONIC DEVICE

CROSS-REFERENCE TO RELATED APPLICATION(S)

This application is a Section 371 National Stage Application of International Application No. PCT/CN2021/119875, filed on Sep. 23, 2021, entitled "METHOD FOR DATA COMMUNICATION AND ELECTRONIC DEVICE", which claims priority to Chinese Application No. 202011069670.0, filed on Sep. 30, 2020, the contents of which are incorporated herein by reference in their entireties.

TECHNICAL FIELD

The present disclosure relates to a field of communication, and more particularly to a method for data communication and an electronic device.

BACKGROUND

With a rapid development of communication technology, the Internet of Things (IoT) has received increasing attention. The IoT, that is, an "Internet of Everything Connected", is an extension and expansion network based on the Internet. It is a huge network formed by combining various information sensing devices (i.e., sensors) with the Internet, to achieve an interconnection of people, machines and things at anytime and anywhere.

According to the statistics of a market research report "State of the market: Internet of things 2016", a global IoT sensor market has exceeded 600 billion per year, including purchase, installation, maintenance of the sensor and a sensor interface software. A sensor owner may obtain more data through the sensor, and a service provider may also provide a value-added service based on the sensor data. With the development of 5G technology, a transmission of the sensor data is more convenient. The sensor data may be transmitted to a data receiver quickly and in real-time.

Therefore, a consensus that the future is an era of data has been reached in various industries such as a communication industry and a manufacturing industry. Data transaction will be a development trend of the future. On the one hand, the data transaction may reduce an investment and operation and maintenance costs of the sensor owner, and on the other hand, the data transaction may also promote a value mining of the data.

A data transaction scheme may use a distributed ledger to achieve the data transaction. Combined with the characteristics of the distributed ledger that data cannot be tampered with and decentralization, a data buyer and a data seller may establish trust and achieve the data transaction based on the distributed ledger. In a conventional data transaction system, a smart contract is signed between a data provider and the data buyer through a blockchain network. The price of the data (for example, in terms of the length of time) is usually specified in the smart contract. The data buyer typically pays for the data based on the length of time to receive a data flow.

However, such data transaction system and method have the following shortcomings:

1. There is a lack of dynamic adjustment to changes in a value of the data provided by different parties. There are various parties in a data transaction platform, such as a manufacturing company that publishes the data, a data label company that labels the data, and an artificial intelligence company that acquire the data to generate a data model and provide a data model parameter, etc. The value of the data provided by various data parties may change. For example, with the improvement of the accuracy of a data collection equipment, the value of raw data will increase; with the improvement of the accuracy of the data labeled by the data label company, the value of labeled data will further increase; and with the upgrading of an algorithm model of the artificial intelligence company, the value of model data will further change. Such data transaction system lacks an efficient method for calculating the value of the data in real-time.

2. There is a lack of real-time and automatic verification of the data. In such a data transaction process, it is usually necessary to manually verify the data, such as verifying the data, verifying the data model, etc. Therefore, such system lacks an efficient method for verifying the data in real-time.

SUMMARY

To at least partially solve or alleviate the above problem, a method for data communication, an electronic device and a system according to embodiments of the present disclosure are provided.

According to a first aspect of the present disclosure, a method for data communication executed at an electronic device of a data transmitter is provided, including: publishing a first contract to a blockchain network or signing a first contract published by a data receiver to the blockchain network, wherein the first contract includes a first method configured to trigger transmission of data between a data transmitter signing the first contract and a data receiver signing the first contract, and a second method configured to trigger determination of a value of the data; and transmitting the data to the data receiver according to the first contract.

In some embodiments, the second method is a value calculating method configured to determine the value of the data.

In some embodiments, the second method is a second contract triggering method configured to trigger an execution of a second contract, and the second contract includes a value calculating method configured to determine the value of the data.

In some embodiments, the second contract is published by the data transmitter or the data receiver to the blockchain network.

In some embodiments, the first contract further includes a contract creating method, the contract creating method is configured to create a first sub-contract of the first contract, and the first contract includes a member variable recording an identifier of the first sub-contract.

In some embodiments, the method further includes: creating, after the value calculating method is executed, the first sub-contract of the first contract by invoking the contract creating method, wherein the first sub-contract includes the value of the data updated after the value calculating method is executed.

In some embodiments, the first sub-contract includes a contract creating method and a value calculating method, the contract creating method of the first sub-contract is configured to create a second sub-contract, and the second sub-contract includes an updated value of the data after the value calculating method of the first sub-contract is executed.

In some embodiments, the data is one of raw data, label data, or a data model, and the first contract is a corresponding contract selected from a raw data contract, a data label contract and a data model contract.

In some embodiments, when the data is the raw data, the first method is a raw data acquiring method configured to trigger the data transmitter to transmit the raw data.

In some embodiments, the value calculating method includes at least one of:
adjusting the value of the raw data according to an accuracy of the raw data;
adjusting the value of the raw data according to a range of the raw data; and
adjusting the value of the raw data according to a quality of the raw data.

In some embodiments, adjusting the value of the raw data according to the accuracy of the raw data includes: adjusting the value of the raw data by comparing a current data accuracy of the raw data with a reference data accuracy.

In some embodiments, adjusting the value of the raw data according to the quality of the raw data includes at least one of:
determining, by invoking a method for label data in a data label contract associated with the first contract, a consistency between the raw data and corresponding label data, so as to adjust the value of the raw data accordingly; and
determining, by invoking a method for starting the data model in the data model contract associated with the first contract, a consistency between the raw data and corresponding data after the raw data being processed by the data model, so as to adjust the value of the raw data accordingly.

In some embodiments, when the data is the label data, the first method is a label data acquiring method configured to trigger the data transmitter to transmit the label data.

In some embodiments, the value calculating method includes at least one of:
adjusting the value of the label data according to a grade of a labeler of the label data;
adjusting the value of the label data according to a type of the label data; and
adjusting the value of the label data according to a quality of the label data.

In some embodiments, adjusting the value of the label data according to the grade of the labeler of the label data includes: adjusting the value of the label data by comparing a current grade of the labeler of the label data with a reference grade of the labeler.

In some embodiments, adjusting the value of the label data according to the type of the label data includes: adjusting the value of the label data by determining a semantic relationship between the label data and corresponding raw data.

In some embodiments, adjusting the value of the label data according to the quality of the label data includes: determining, by invoking a method for starting the data model in the data model contract associated with the first contract, a consistency between the label data and data after the raw data corresponding to the label data being processed by the data model, so as to adjust the value of the label data accordingly.

In some embodiments, when the data is the data model, the first method is a model data acquiring method configured to trigger the data transmitter to transmit the data model or a method for starting the data model.

In some embodiments, the value calculating method includes: adjusting the value of the model data by comparing a current model accuracy of the model data with a reference model accuracy.

In some embodiments, the value calculating method includes:
acquiring the raw data by invoking a method for acquiring data of the raw data contract corresponding to the first contract;
acquiring the label data corresponding to the raw data by invoking a method for label data of the data label contract corresponding to the first contract;
calculating by using the data model for the raw data to obtain result data;
determining a model accuracy of the data model by comparing the result data with the label data; and
adjusting the value of the data model according to the model accuracy of the data model.

According to a second aspect of the present disclosure, a first electronic device used at the data transmitter is provided, including: a processor; and a memory storing instructions, wherein the instructions, when executed by the processor, cause the first electronic device to implement the method according to the first aspect of the present disclosure.

According to a third aspect of the present disclosure, a method for data communication executed at an electronic device of a data receiver is provided, including: publishing a first contract to a blockchain network or signing a first contract published by a data transmitter to the blockchain network, wherein the first contract includes a first method configured to trigger transmission of data between a data transmitter signing the first contract and a data receiver signing the first contract, and a second method configured to trigger determination of a value of the data; and receiving the data from the data transmitter according to the first contract.

In some embodiments, the second method is a value calculating method configured to determine the value of the data.

In some embodiments, the second method is a second contract triggering method configured to trigger an execution of a second contract, and the second contract includes a value calculating method configured to determine the value of the data.

In some embodiments, the second contract is published by the data transmitter or the data receiver to the blockchain network.

In some embodiments, the first contract further includes a contract creating method, the contract creating method is configured to create a first sub-contract of the first contract, and the first contract includes a member variable recording an identifier of the first sub-contract.

In some embodiments, the method further includes: creating, after the value calculating method is executed, the first sub-contract of the first contract by invoking the contract creating method, wherein the first sub-contract includes the value of the data updated after the value calculating method is executed.

In some embodiments, the first sub-contract includes a contract creating method and a value calculating method, the contract creating method of the first sub-contract is configured to create a second sub-contract, and the second sub-contract includes an updated value of the data after the value calculating method of the first sub-contract is executed.

In some embodiments, the data is one of raw data, label data, or a data model, and the first contract is a corresponding contract selected from a raw data contract, a data label contract and a data model contract.

In some embodiments, when the data is the raw data, the first method is a raw data acquiring method configured to trigger the data transmitter to transmit the raw data.

In some embodiments, the value calculating method includes at least one of:

adjusting the value of the raw data according to an accuracy of the raw data;

adjusting the value of the raw data according to a range of the raw data; and adjusting the value of the raw data according to a quality of the raw data.

In some embodiments, adjusting the value of the raw data according to the accuracy of the raw data includes: adjusting the value of the raw data by comparing a current data accuracy of the raw data with a reference data accuracy.

In some embodiments, adjusting the value of the raw data according to the quality of the raw data includes at least one of:

determining, by invoking a method for label data in a data label contract associated with the first contract, a consistency between the raw data and corresponding label data, so as to adjust the value of the raw data accordingly; and determining, by invoking a method for starting the data model in the data model contract associated with the first contract, a consistency between the raw data and corresponding data after the raw data being processed by the data model, so as to adjust the value of the raw data accordingly.

In some embodiments, when the data is the label data, the first method is a label data acquiring method configured to trigger the data transmitter to transmit the label data.

In some embodiments, the value calculating method includes at least one of:

adjusting the value of the label data according to a grade of a labeler of the label data;

adjusting the value of the label data according to a type of the label data; and adjusting the value of the label data according to a quality of the label data.

In some embodiments, adjusting the value of the label data according to the grade of the labeler of the label data includes: adjusting the value of the label data by comparing a current grade of the labeler of the label data with a reference grade of the labeler.

In some embodiments, adjusting the value of the label data according to the type of the label data includes: adjusting the value of the label data by determining a semantic relationship between the label data and corresponding raw data.

In some embodiments, adjusting the value of the label data according to the quality of the label data includes: determining, by invoking a method for starting the data model in the data model contract associated with the first contract, a consistency between the label data and data after the raw data corresponding to the label data being processed by the data model, so as to adjust the value of the label data accordingly.

In some embodiments, when the data is the data model, the first method is a model data acquiring method configured to trigger the data transmitter to transmit the data model or a method for starting the data model.

In some embodiments, the value calculating method includes: adjusting the value of the model data by comparing a current model accuracy of the model data with a reference model accuracy.

In some embodiments, the value calculating method includes:

acquiring the raw data by invoking a method for acquiring data of the raw data contract corresponding to the first contract;

acquiring the label data corresponding to the raw data by invoking a method for label data of the data label contract corresponding to the first contract;

calculating by using the data model for the raw data to obtain result data;

determining a model accuracy of the data model by comparing the result data with the label data; and adjusting the value of the data model according to the model accuracy of the data model.

According to a fourth aspect of the present disclosure, a second electronic device used at the data receiver is provided, including: a processor; and a memory storing instructions, wherein the instructions, when executed by the processor, cause the first electronic device to implement the method according to the third aspect of the present disclosure.

According to a fifth aspect of the present disclosure, a computer-readable storage medium having instructions stored thereon is provided. The instructions, when executed by a processor, cause the processor to execute the method for data communication of the first or third aspect mentioned above.

According to the above method, electronic device, system and/or computer-readable storage medium, based on the construction of a distributed ledger (including IOTA, blockchain, etc.), various data parties such as a data provider, a data labeler, a data analyzer, etc. are connected to a distributed ledger system. On the one hand, the dynamic adjustment of data value changes provided by different parties is achieved through the smart contract. On the other hand, the automatic verification of data is achieved through the smart contract, thereby improving a flow of the data, a mining of the data value and an automation level of the parties.

BRIEF DESCRIPTION OF THE DRAWINGS

The above and other objects, features and advantages of the present disclosure will be made more apparent by the following description of some embodiments of the present disclosure in conjunction with the accompanying drawings, in which:

FIG. 7 is a flowchart illustrating an example method executed in an electronic device of a data transmitter according to an embodiment of the present disclosure;

DETAILED DESCRIPTION OF EMBODIMENTS

Figure 1:
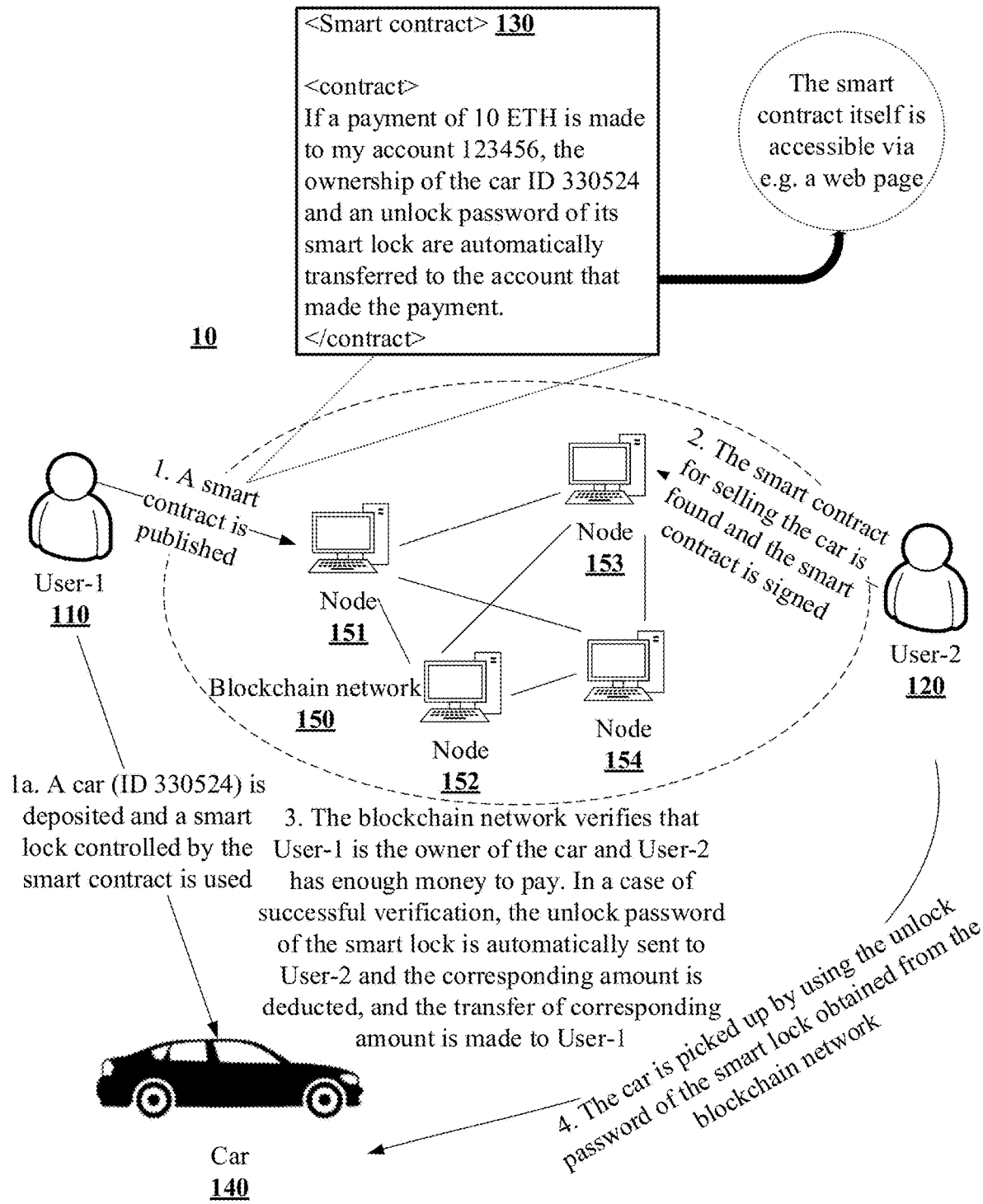
FIG. 1 is a schematic diagram illustrating an example application scenario for illustrating a blockchain-network-based example smart contract.

In order to make objects, technical solutions and advantages of the present application more clear, the present application will be further described in detail below with reference to the accompanying drawings. It should be noted that the following description is for illustration only, and not for limiting the present disclosure. In the following description, numerous specific details are set forth in order to provide a thorough understanding of the present disclosure. However, it is obvious to those skilled in the art that it is not necessary to adopt these specific details to practice the present disclosure. In other instances, well-known circuits, materials or methods are not described in detail in order to avoid obscuring the present disclosure.

Throughout this specification, references to "one embodiment," "an embodiment," "one example," or "an example" mean that a particular feature, structure, or characteristic described in conjunction with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular feature, structure or characteristic may be combined in any suitable combination and/or sub-combination in one or more embodiments or examples. Furthermore, those skilled in the art should understand that the drawings provided herein are for illustrative purposes and are not necessarily drawn to scale. The term "and/or" as used herein includes any and all combinations of one or more of the associated listed items.

It should be noted that although the embodiments herein are described in detail by taking "data transaction" as an example below, the present disclosure is not limited thereto. In fact, the data transaction is only one specific application scenario of a scheme of "data communication" proposed here. The scheme of the data communication in this application may be applied to any situation that requires the data communication, such as non-transactional data communication.

Furthermore, although the term "smart contract" or "contract" in an ethereum technology and a Solidity programming language it uses are adopted here, the present disclosure is not limited thereto. In fact, the term "contract" here may refer to information that related to establishing, maintaining, changing, tearing down a data flow, etc. which proposed by at least one party in a data transaction (or data communication). Thus the terms "smart contract" and/or "contract" etc. may also be any information that may be transmitted on the network, such as an application, an APP, a source code, an executable code, a message, a text, binary data, software, firmware, etc. In addition, the terms "smart contract" and/or "contract" may not refer to other information related to the data flow as well when applied in areas other than the data communication.

Furthermore, the term "data flow" generally refers to a series of digitally encoded ordered signals or their carriers which are used to transmit or receive information during their transmission. In other words, the term "data flow" here may refer to a series of information itself transmitted between two or more entities, and may also refer to a logical channel established between the two or more entities to transmit such information.

As mentioned above, a traditional data transaction method has various problems, such as: difficulty in maintaining integrity of transaction data, non-transparency of the transaction, difficulty in tracing a transaction history, easy modification of relevant information, and inability to establish a new data connection for the data receiver in time when the data connection is disconnected etc., so that interests of both parties in the data transaction may be damaged. Compared with the traditional data transaction method, a blockchain-based data transaction method has received more and more attention owing to advantages of distribution, decentralization, and immutability and irrevocability of the transaction data.

A blockchain-based data transaction system usually includes one or more data providers (here, may further be referred to as "a data transmitter"), one or more data buyers (here, may further be referred to as "a data receiver") and the blockchain network. The blockchain network usually includes a plurality of nodes. Information related to the data transaction between the data provider and the data buyer may be stored in the plurality of nodes in the blockchain network. During a data transaction process, one or both of the data buyer and the data provider may publish a smart contract to the blockchain network. The smart contract may trigger the data buyer to establish a data communication with the data provider, and receive data and pay through the data communication.

The smart contract is one of the important features of a blockchain-based data transaction. A concept of the smart contract was first proposed by Nick Szabo in 1994, who defined the smart contract as follows: "A smart contract is a set of commitments defined in a digital form, including an agreement on which contract participants may execute these commitments". The smart contract is a computer protocol designed to inform, verify, or execute a contract in an informative manner. The smart contract allows for trusted transactions without a third-party, and such transactions are traceable and often irreversible (unless there is a retraction clause in the contract, etc.).

More generally, the smart contract may be thought of as a computer program or a transaction agreement intended to automatically execute, control or document a legally relevant event in accordance with terms of the contract or the agreement. A purpose of the smart contract is to reduce the need for a trusted arbitrator, reduce the cost of arbitration and enforcement, reduce fraud losses, and reduce a malicious and an accidental behavior.

A blockchain-technology-based smart contract may not only give play to advantages of the smart contract in terms of cost efficiency, but may further avoid the malicious behavior that interferes with a normal execution of the contract. The smart contract is written into the blockchain in the digital form. Characteristics of the blockchain technology ensure that the entire process of storage, reading, and execution is transparent, traceable and immutable. Besides, a state machine system may be established through a consensus algorithm that comes with the blockchain, so that the smart contract may run more efficiently. Next, a blockchain-network-based smart contract will be explained in detail with reference to FIG. 1.

FIG. 1 is a schematic diagram illustrating an example application scenario 10 for illustrating a blockchain-network-based example smart contract. As shown in FIG. 1, the scenario 10 includes a user-1 110 who wants to sell his own car 140, a user-2 120 who wants to buy a car, and a blockchain network 150 including a plurality of nodes 151 to 154. However, it should be noted that the scenario 10 of FIG. 1 is for illustration only, and the present disclosure is not limited thereto. In other embodiments, the scenario 10 may include more users and items (e.g., the car 140), and the blockchain network 150 may include more, fewer, or different nodes.

As shown in FIG. 1, the user-1 110 wants to sell his car 140. Thus, at step 1, the user-1 110 may write a smart contract 130 and publish the smart contract 130 to the blockchain network 150.

For example, in some embodiments, the user-1 110 may register to an Ethereum network, for example, obtain an assigned account ID (e.g., 123456), and then upload and deploy the written smart contract 130 to at least one of the nodes 151 to 154 on the network through an application provided by the Ethereum network.

In some embodiments, a content of a simple example smart contract 130 may look like this:

```
// SPDX-License-Identifier: GPL-3.0
pragma solidity >0.6.99<0.8.0;
contract Sell_A_Car{
    address payable public seller; ///member variable "seller"
    address payable public buyer; /// member variable "buyer"
    address public car; /// member variable "car"
    bytes32 passcode; /// member variable "smart lock password"
    enum State { Created, Locked, Release, Inactive }
    State public state; /// member variable "contract state"
    modifier condition(bool _condition) {
        require(_condition);
        _;
    }
    modifier onlyBuyer( ) {
        require(
            msg.sender == buyer,
            "Only the buyer may invoke this function."
        );
        _;
    }
    modifier onlySeller( ) {
        require(
            msg.sender == seller,
            "Only the seller may invoke this function."
        );
        _;
    }
    modifier inState(State _state) {
        require(
            state == _state,
            "invalid state"
        );
        _;
    }
    event Aborted( ); /// Publish an event that the seller aborted the transaction
    event PurchaseConfirmed( ); /// Publish an event that the buyer confirms a purchase
    event CarReceived( ); /// Publish an event that the buyer has received the car
    event SellerRefunded( ); /// Publish an event that the seller has received a car payment
    /// A constructor, which initializes the contract and specified an identity of the seller, an
identity of the car and the smart lock password involved in the contract.
    constructor(address payable _car, bytes32 _passcode) payable {
        seller = msg.sender;
        car = _car;
        passcode = _passcode;
    }
    /// A function of abort purchase, which may only be invoked by the seller before the
contract is locked.
    function abort( )
        public
        onlySeller
        inState(State.Created)
    {
        emit Aborted( );
        state = State.Inactive;
    }
    /// A function that the buyer confirms the purchase, and the contract notifies the buyer of
the smart lock password.
    /// The transaction must include 10 ETH, which will be locked until a confirmReceived
function is invoked.
    function confirmPurchase( ) returns (bytes32)
        public
        inState(State.Created)
        condition(msg.value == 1e19)
        payable
    {
        emit PurchaseConfirmed( );
```

```
        buyer = msg.sender;
        state = State.Locked;
        return passcode;
    }
    /// A function to confirm that the buyer has received the car, which will release the
locked ETH
    function confirmReceived( )
        public
        onlyBuyer
        inState(State.Locked)
    {
        emit CarReceived( );
        state = State.Release;
    }
    /// This function returns money to the seller, that is, a function that pays the seller for the
car
    function refundSeller( )
        public
        onlySeller
        inState(State.Release)
    {
        emit SellerRefunded( );
        state = State.Inactive;
        seller.transfer(address(this).balance)
    }
}
```

A general function of the above code may be described in "Smart Contract 130" in FIG. 1. When a buyer (e.g., the user-2 120) pays 10 ETH to the user-1 110, the smart contract will automatically inform the smart lock password to the buyer and waits for the buyer to confirm receipt. After successful receipt, the blockchain network 150 will record a transfer of an ownership of the car through a published event and transfer the 10 ETH to the user-1 110.

Specifically, when initializing (or instantiating) the smart contract 130, a seller (e.g., the user-1 110) may set a blockchain network address of the seller (e.g., 123456 shown in FIG. 1), a blockchain network address of the car (e.g., 330524 shown in FIG. 1), and the smart lock passcode associated with the car (e.g., the member variable "passcode" in the above code) through, for example, a constructor "constructor" of the contract.

Additionally, before, after, or at the same time as the step 1, the user-1 110 may, at step 1a, deposit the car 140 in a public garage and lock the car 140 using a smart lock controlled by the smart contract 130 (e.g., the car 140 is placed in a designated garage locked by the smart lock), and its unlock password is set to, for example, the preceding passcode. In other embodiments, the smart lock may have a networking function, and may automatically generate a new password before each transaction under the control of the smart contract 130 to prevent the password from being known to anyone other than a final buyer due to the failure of a previous transaction.

Afterwards, the smart contract 130 itself may be made known to the public, e.g., through a web page publication.

Later, at step 2, the user-2 120 who wants to buy the car may find the smart contract 130 published by the user-1 110 through the web page or directly on the blockchain network 150, learn relevant information through the smart contract 130 (e.g., through a web page associated with the smart contract 130, or in other embodiments, conditions of the car are written directly in the smart contract 130), and sign the smart contract 130 if the user-2 120 wants to buy the car. Specifically, the user-2 120 may sign the contract 130 by, for example, invoking the above "confirmPurchase( )" member method.

After receiving a signature (or invoking a method) of the user-2 120, at step 3, the plurality of nodes in the blockchain network 150 may verify the transaction, such as verifying whether the user-1 110 is an owner of the car (e.g., by checking a transaction record related to the car ID 330524), and whether an account of the user-2 120 has enough money to make the payment (e.g., verified by the modifier condition (msg.value==1e19) of the confirmPurchase( ) method in the above code). In a case of successful verification, an unlock password of the smart lock is automatically sent to the user-2 120 and a corresponding amount is reduced in the account of the user-2 120, and the corresponding amount is added to an account of the user-1 110.

At step 4, after obtaining the unlock password of the smart lock from the blockchain network 150, the user-2 120 may pick up the car 140 with the obtained unlock password. In other embodiments, the user-2 120 may further confirm that the transaction is successful (as shown in the above example code) after determining that the car 140 may be picked up, and then confirm a corresponding transfer operation.

In some embodiments, the blockchain network 150 may record transaction information in at least one of the plurality of nodes 151 to 154. For example, when a plurality of events in the above code are published, the corresponding events may be recorded in respective nodes to record a transaction process.

It should be noted that although the simple example smart contract for transaction is given above, the present disclosure is not limited thereto. In fact, the smart contract 130 may be modified to include more or different member variables and/or member methods, etc. It may further be used in a data transaction scenario as described below.

For example, a data provider may be the user-1 110 and a data buyer may be the user-2 120. Details of a data transaction between two parties may be specified in the smart contract by, for example, a parameter (e.g., a parameter in the member method or the member variable) such as (but not limited to): how to establish the data communication and a price/pricing method for data, how to settle the data, how to end the data communication, a resolution scheme of a disagreement, a termination condition, etc. In a case of adopting the blockchain network 150 to achieve such data transaction, problems such as the difficulty in maintaining the integrity of transaction data, non-transparency of the transaction, the difficulty in tracing the transaction history and the easy modification of related information may be well solved.

Figure 2:
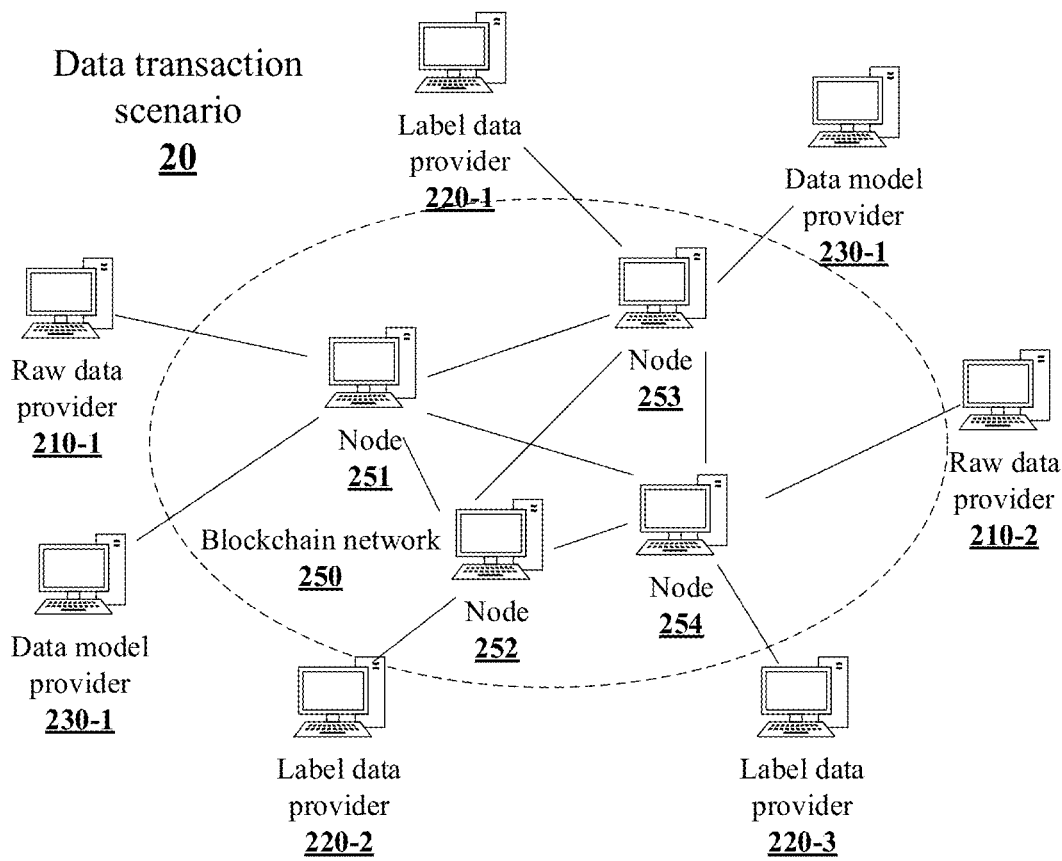
FIG. 2 is a schematic diagram illustrating a blockchain-based data transaction scenario according to an embodiment of the present disclosure.
Figure 3A:
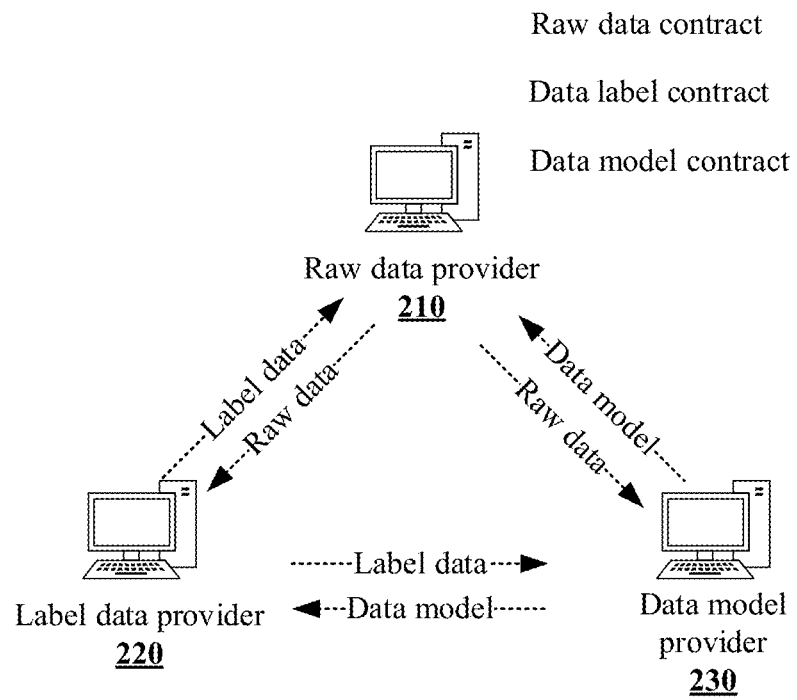
FIG. 3A and FIG. 3B are examples illustrating various parties and related contracts in a blockchain-based data transaction scenario.
Figure 3B:
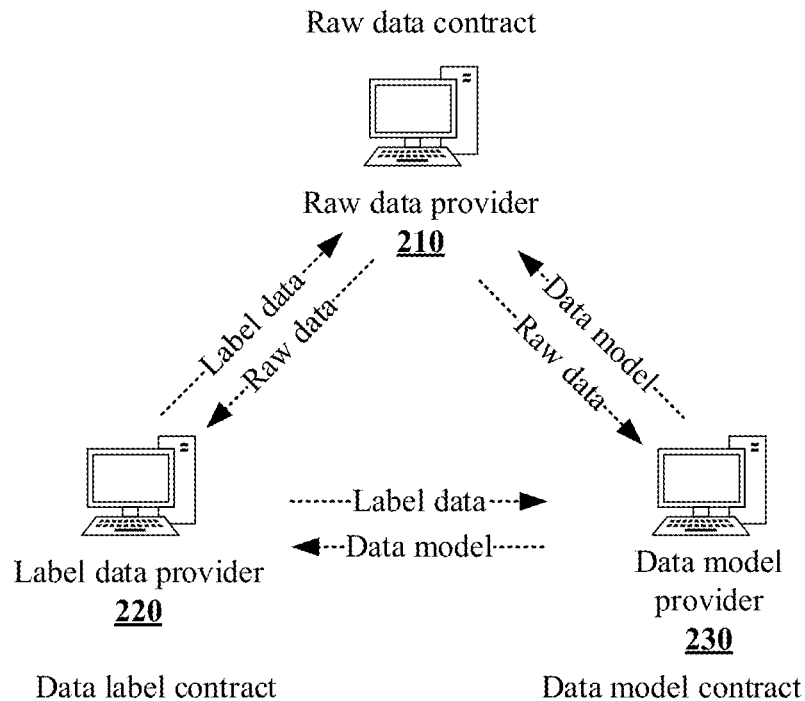

Currently, more and more companies add to the blockchain network (in some embodiments, the blockchain network is a consortium chain) to achieve the data transaction through the blockchain network. FIG. 2 is a schematic diagram illustrating a blockchain-based data transaction scenario 20 according to an embodiment of the present disclosure. FIG. 3A and FIG. 3B are examples illustrating various parties and related contracts in a blockchain-based data transaction scenario.

In the example scenario 20, there may be two raw data providers 210-1 and 210-2 capable of providing raw data (for example, a manufacturing company that may provide the raw data, etc.), three label data providers 220-1 to 220-3 capable of providing label data, and two data model providers 230-1 and 230-2 capable of providing the data model. The raw data is data that has not been processed by a third party, and its example may include data directly reported by a terminal equipment, production data collected by a factory processing equipment (such as a sensor, log data, etc. The label data is data generated by the third party (e.g. a label company) after analyzing or processing the raw data, such as a structured description of the raw data. The label data is usually complementary to the raw data, and may be used together with the raw data as training data, validation data, etc. of artificial intelligence. The data model is a model for processing or characterizing the raw data obtained by modeling or model training the raw data. Examples of the data model may include parameters, functions, settings of various layers, etc. of each node of a neural network. Data transaction, which is between any two of the raw data provider, the label data provider and the data model provider, may be conducted through the blockchain network 250. The blockchain network 250 may include four nodes 251 to 254 that communicate with each other. However, the present disclosure is not limited thereto. In other embodiments, there may be more, fewer, or different raw data providers, label data providers, data model providers, and/or nodes of the blockchain network 250.

Specifically, each of the raw data providers 210-1 and 210-2, the label data providers 220-1 to 220-3, and the data model providers 230-1 and 230-2 may respectively publish a smart contract to the blockchain network 250. The smart contract may contain information related to the data transaction, such as a type and a price of the provided data, a data acquiring method, etc. Correspondingly, each of the raw data providers 210-1 and 210-2, the label data providers 220-1 to 220-3, and the data model providers 230-1 and 230-2 may further act as a data buyer or a data receiver to sign a corresponding smart contract according to its own needs, and conduct the transaction with one or more corresponding data providers. In some embodiments, such data transaction is achieved through data communication established between the data buyer and the data provider.

It should be noted that although terms such as the raw data provider, the label data provider, or the data model provider are used in FIG. 2, this is for ease of illustration only. Any of the raw data provider, the label data provider, or the data model provider may additionally or alternatively be the data receiver. For example, FIG. 3A and FIG. 3B show possible data transactions and related smart contracts between any two of the raw data provider, the label data provider or the data model provider. The related smart contracts include: a raw data contract, a data label contract and a data model contract. In FIG. 3A, an example is shown in which the raw data provider publishes the raw data contract, the data label contract and the data model contract. In an example of FIG. 3B, it is shown that the raw data provider publishes the raw data contract, the label data provider publishes the data label contract, and the data model provider publishes the data model contract. However, the examples described in FIG. 3A and FIG. 3B are merely illustrative and not restrictive. One or more of the related contracts may be provided by a party providing the data (which may be any one of the raw data provider, the label data provider, and the data model provider), or by a party buying the data (which may be any one of the raw data provider, the label data provider, and the data model provider). In some embodiments, a publisher of the smart contract may be further determined according to a supply and demand relationship of a data market. For example, if the supply in an early stage is less than the demand, the contract may be formulated and published in the early stage by the party providing the data. As the supply and demand relationship of the platform changes, the contract may be formulated and published by the party receiving or buying the data when the supply exceeds the demand. As mentioned earlier, the price of the data (for example, in terms of the length of time) is usually specified in the smart contract. The data buyer typically pays for the data based on the length of time to receive the data.

However, such data transaction system and method have the following shortcomings:

1. There is a lack of dynamic adjustment to changes in a value of the data provided by different parties. There are various parties in a data transaction platform, such as a manufacturing company that publishes the data, a data label company that labels the data, and an artificial intelligence company that acquire the data to generate a data model and provide a data model parameter, etc. The value of the data provided by various data parties may change. For example, with the improvement of the accuracy of a data collection equipment, the value of the raw data will increase; with the improvement of the accuracy of the data labeled by the data label company, the value of labeled data will further increase; and with the upgrading of an algorithm model of the artificial intelligence company, the value of model data will further change. Such data transaction system lacks an efficient method for calculating the value of the data.

2. There is a lack of automatic verification of the data. In such a data transaction process, it is usually necessary to manually verify the data, such as verifying the data, verifying the data model, etc. Therefore, such system lacks an efficient method for verifying the data.

To at least partially solve or alleviate the above problem, a method for data communication, an electronic device, and a system according to the embodiments of the present disclosure are provided. In general, this scheme may be implemented to calculate the value of the data provided by the various parties in real-time through a value calculating method of the data in the smart contract. In addition, the solution may further verify the data provided by each party in real-time through a data verifying method in the smart contract. Hereinafter, a data transaction process according to the embodiments of the present disclosure will be described with reference to FIG. 4 to FIG. 6.

Figure 4:
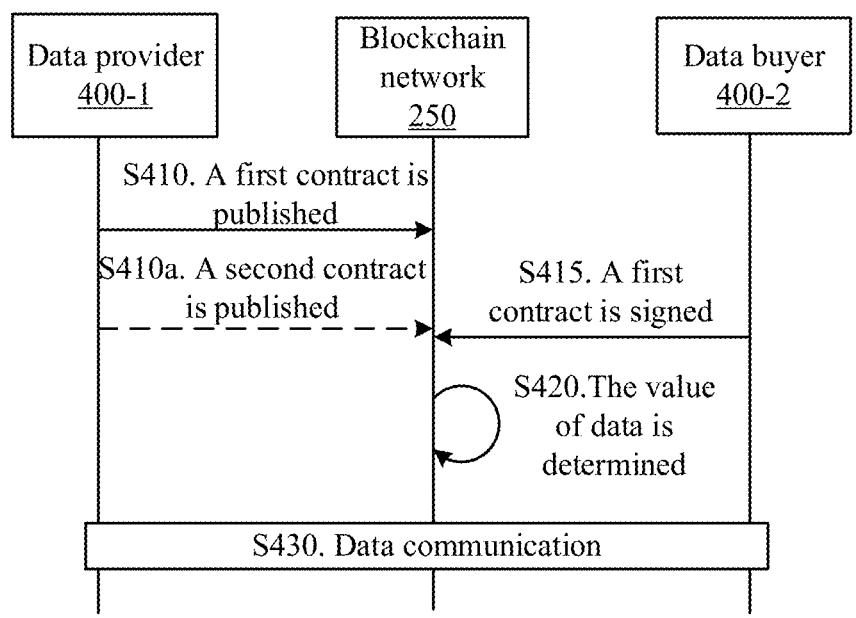
FIG. 4 is a schematic diagram illustrating a message flow of an example data transaction process according to an embodiment of the present disclosure.

FIG. 4 is a schematic diagram illustrating a message flow of an example data transaction process according to an embodiment of the present disclosure. It should be noted that steps shown in FIG. 4 do not necessarily appear in the order shown, but may be reversed. For example, step S420 of determining the value of the data may occur before step S415 of a data buyer 400-2 signing a first contract. Furthermore, as will be described below, various steps may further, for example, be performed interleaved, and thus the embodiments of the present disclosure are not limited to steps shown in FIG. 4. In addition, some optional steps (shown in dotted lines) shown in FIG. 4 may further be omitted.

In addition, it should be noted that a data provider 400-1 shown in FIG. 4 may be any entity, company, etc. that may provide the data, such as but not limited to any one of the raw data providers 210-1 and 210-2, the label data providers 220-1 to 220-3, and the data model providers 230-1 and 230-2 described in FIG. 2, FIG. 3A and FIG. 3B. A data buyer 400-2 may be any entity, company, etc. that require the data, such as but not limited to any one of the raw data providers 210-1 and 210-2, the label data providers 220-1 to 220-3, and the data model providers 230-1 and 230-2 described in FIG. 2, FIG. 3A and FIG. 3B.

At step S410, the data provider 400-1 may publish the first contract to the blockchain network 250. The first contract may include a data transmitting method used to trigger to transmit the data between a data provider signing the first contract and a data buyer signing the first contract, and a data value calculating method used to trigger determination of the value of the data. In some embodiments, the first contract may include at least one of: a data type, a data provider identifier, a data address, a charging method, a data accuracy, a data value, the data transmitting method, and the data value calculating method.

For example, the member variables and the member methods that may be included in the first contract are shown in Table 1 below.

TABLE 1

Member table for the example first contract

| First Contract Member | Description |
|---|---|
| Member Variable | Data type (e.g. raw data, label data, and data model) Data provider identifier Data address Charging method Original data value Updated data value Data accuracy Period of updating the data value (optional) |
| Member Method | Data transmitting method( ) ///used to transmit the data between the data provider and the data buyer Data value calculating method( ) ///calculating the data value in real-time |

As mentioned above, the data provider 400-1 may be any one of the raw data providers 210-1 and 210-2, the label data providers 220-1 to 220-3, and the data model providers 230-1 and 230-2 described in FIG. 2, FIG. 3A and FIG. 3B. In an embodiment that the data provider 400-1 provides the raw data, the first contract may be a data contract, a data type in the first contract may be the raw data, and a data transmitting method may be a raw data acquiring method used to trigger the data provider 400-1 to transmit the raw data. In an embodiment that the data provider 400-1 provides the label data, the first contract may be the label data contract, the data type in the first contract may be the label data, and the data transmitting method may be a label data acquiring method used to trigger the data provider 400-1 to transmit the label data. In an embodiment that the data provider 400-1 provides the data model, the first contract may be the model data contract, the data type in the first contract may be the model data, and the data transmitting method may be a model data acquiring method used to trigger the data provider 400-1 to transmit the data model or a method for starting the data model.

Optionally, at step S410a, the data provider 400-1 may publish, for example, a data value contract to the blockchain network 250. The data value contract includes a data value calculating method used to determine the value of the data. In this case, the first contract may not include the data value calculating method, but a data value contract triggering method. When the data value contract triggering method is triggered, it causes the data value contract to be executed to calculate the value of the data in real-time.

At step S415, the data buyer 400-2 signs the first contract. Those skilled in the art may understand that the signing of the first contract by the data buyer 400-2 means that the data buyer 400-2 accepts the real-time calculation of the data value, and pays the data provider 400-1 according to the real-time calculated data value.

Although in the embodiment of FIG. 4, the first contract and an optional second contract are shown as being published by the data provider 400-1, the present disclosure is not limited thereto. It is described in this way to make the invention clearer. Those skilled in the art will readily understand that one or both of the first contract and the second contract may alternatively be published by the data buyer 400-2 and signed by the data provider 400-1.

In step S420, the blockchain network 250 invokes the data value calculating method in the first contract or the second contract to calculate the data value in real-time. The calculation of the data value may be performed in response to an event. For example, the event may be based on time or a specific external event, such as a period of updating the data price that may be included in the first contract or the second contract. When the period expires, a data price calculating method in the first contract or the second contract is automatically triggered. The external event may be a specific event, such as a stock index greater than 3000 points, etc.

In the embodiment that the data provider 400-1 provides the raw data, the data value calculating method in the first contract or the second contract may adjust the value of the raw data according to the accuracy of the raw data. For example, the value of the raw data may be adjusted by comparing a current data accuracy of the raw data with a reference data accuracy. The reference data accuracy may be a predefined accuracy based on factors such as data buyer needs, market needs, equipment that collects the raw data, etc. In some cases, the data provided by the raw data provider may have improved accuracy (e.g. the data accuracy increased from two decimal places to three decimal places) due to upgrades in the equipment that collects the data. In this case, such an increase in the data accuracy may be detected by a first smart contract or a second smart contract. Such increase in accuracy should be taken into account when invoking the data value calculating method, for example, to increase the value of the data by a certain amount percentage, e.g. 10%. Similarly, the accuracy of the collected data may decrease due to aging, wear, etc. of the equipment that collects the raw data. In this case, the data value calculating method may appropriately reduce the value of the data.

In some embodiments, additionally or alternatively, the data value calculating method may adjust the value of the raw data according to a range of the raw data. For example, when the range of the raw data changes, a degree of correlation between the raw data is further determined. The value of the data is high when the correlation of the data is high.

In addition, completeness of a data source of the raw data may further be used as the basis for determining the value of the data. For example, in the case that the raw data provider includes several pipeline devices, when the raw data only contains data of a small number of pipeline devices, its data value may be low. When there are data of multiple or all pipeline devices in the network, the data value may be high.

In some embodiments, additionally or alternatively, the data value calculating method adjusts the value of the raw data according to a quality of the raw data. In the example shown in FIG. 4, as described above, in the case that the data provider 400-1 is the raw data provider, the data buyer 400-2 may be one or more of the label data provider or the data model provider. In this case, although not shown in FIG. 4, it is obvious that the label data provider may be a data provider to publish the label data contract to the blockchain network 250, and the raw data provider may be a data buyer to sign the label data contract. A consistency between the raw data and the corresponding label data may be determined by invoking a method for label data in the data label contract, so as to adjust the value of the raw data accordingly. For example, a higher consistency indicates that the quality of the data is likely to be higher, and thus the value of the data is higher. Conversely, a lower consistency indicates that the quality of the data is likely to be lower, and thus the lower the value of the data. Similarly, the data model provider may be a data provider to publish the data model contract to the blockchain network, and the raw data provider may be a data buyer to sign the data model contract. In this case, a consistency between the raw data and corresponding data after the raw data being processed by the data model may be determined by invoking a method for starting the data model in the data model contract, so as to adjust the value of the raw data accordingly. For example, a higher consistency indicates that the quality of the data is likely to be higher, and thus the value of the data is higher. Conversely, a lower consistency indicates that the quality of the data is likely to be lower, and thus the value of the data is lower.

In the embodiment that the data provider 400-1 provides the label data, the value calculating method in the first contract or the second contract may adjust the value of the label data according to a grade of a labeler that labels the data. The grade of the labeler may be determined based on, for example, the labeler's brand, size, reputation, etc. In some embodiments, this may include adjusting the value of the label data by comparing a current grade of the labeler of the label data with a reference grade of the labeler. The reference grade of the labeler may be a predetermined grade. If the current grade of the labeler is higher than the reference grade of the labeler, the value calculating method should increase the value of the label data, otherwise it will reduce the value of the label data.

In some embodiments, additionally or alternatively, the data value calculating method may adjust the value of the label data according to the type of the label data. For example, the data value calculating method may adjust the value of the label data by determining a semantic relationship between the label data and its corresponding raw data. The semantic relationship may include, for example, relationships such as contain, adjacent, etc. The semantic relationship "contain" is, for example, a relationship between a temperature of a pipeline and a temperature of a device in the pipeline. When there is the semantic relationship, the value of the label data is higher; otherwise the value of the label data is lower.

In some embodiments, additionally or alternatively, the data value calculating method may adjust the value of the label data according to the quality of the label data. For example, although not shown in FIG. 4, the data model provider may be a data provider to publish the data model contract to the blockchain network, and the label data provider may be a data buyer to sign the data model contract. In this case, a consistency between the label data and data after the raw data corresponding to the label data being processed by the data model may be determined by invoking a method for starting the data model in the data model contract, so as to adjust the value of the label data accordingly. For example, a higher consistency indicates that the quality of the label data is likely to be higher, and thus the value of the data is higher; otherwise the value of the data is lower.

In the embodiment that the data provider 400-1 is the data model provider, the value calculating method in the first contract or the second contract may adjust the value of the model data by comparing a current model accuracy of the model data with a reference model accuracy. If the current model accuracy is higher than the reference model accuracy, the value calculating method should increase the value of the data model; otherwise, it will reduce the value of the data model. Specifically, when the raw data provider, the label data provider and the data model provider are all added to the blockchain network and there are various contracts (the raw data contract, the data label contract and the data model contract) that respond, the calculation of the value of the data model may include: acquiring the raw data by invoking a method for acquiring data of the raw data contract corresponding to the first contract; acquiring the label data corresponding to the raw data by invoking a method for label data of the data label contract corresponding to the first contract; calculating by using the data model for the raw data to obtain result data; determining a model accuracy of the data model by comparing the result data with the label data; and adjusting the value of the data model according to the model accuracy of the data model.

Referring back to FIG. 4, in step S430, data communication is performed between the data provider 400-1 and the data buyer 400-2, wherein the data has the value calculated at step S420. The data communication may be achieved by, for example, invoking the data transmitting method in the first contract by the blockchain network 250.

In some embodiments, for example, in a case that the data provider 400-1 is the raw data provider, the data communication between the raw data provider and the data buyer (e.g., the label data provider or the data model provider) may be achieved by a data flow, and the data transmitting method in the first contract may be a data flow establishing method. In this case, the blockchain 250 may respectively instruct the raw data provider and the data buyer to establish a data flow with each other. For example, the data flow between the two may be established by invoking the data flow establishing method in the first contract. For example, in this method, the raw data provider or the data buyer may be provided with the other party's information and make it establish a data connection with the other party. In other embodiments, if the data flow on the data connection needs to be regulated, the blockchain network 250 may respectively establish the data flow with the raw data provider and the data buyer, and forward them between the two data flows. Therefore, the data flow may be regulated, and for example, fair, open, and just charging processing (e.g., an amount of data transmitted by the data flow, whether the data flow is interrupted, etc.) is performed accordingly.

It should be noted that the data flow is only one example way of achieving the data communication between the raw data provider and the data buyer. The data communication between the raw data provider and the data buyer may further be achieved in any other suitable manner. Furthermore, in a case that the data provider is the label data provider or the data model provider, data communication between the data provider and the data buyer may be achieved via other suitable means (e.g. a data packet).

Although not shown, a signal flow diagram in FIG. 4 may further include relevant steps for contract termination. For example, after the data communication is established, the data provider 400-1 and/or the data buyer 400-2 may send a request to the blockchain network 250 for termination of the first contract. For example, in some embodiments, when the data provider 400-1 needs to be shut down for maintenance, it may consider temporarily stopping the provision of corresponding data, and thus may initiate the termination of the first contract. In other embodiments, when the data buyer 400-2 may need to temporarily maintain the equipment, it may further initiate the contract termination. These contract termination requests should not violate relevant regulations that may exist in the previously published contract, such as a period of the contract, etc. In addition, in other embodiments, after the data buyer 400-2 obtains required data, it may further initiate the termination of the contract.

In this case, the one or more nodes in the blockchain network 250 may determine whether the data provider 400-1 and/or the data buyer 400-2 satisfy a contract termination condition. For example, for the data buyer 400-2, the contract termination condition may be whether the data buyer has paid for the data. For the data provider 400-1, the contract termination condition may be whether the data provider has provided enough data, and the like. In addition, it is further possible to check whether the two parties satisfy other contract termination conditions, such as the period of the contract, etc., as described above. In a case that the contract termination condition is satisfied, the one or more nodes in the blockchain network 250 may instruct the data provider 400-1 and/or the data buyer 400-2 to terminate the contract and disconnect the data communication between the two. For example, in the case that the data communication is established directly between the aforementioned two, one of the two may be instructed to disconnect the data communication. In the case where the data communication is established via the blockchain network 250, the two may be respectively instructed to disconnect the data communication.

According to the embodiment shown in FIG. 4, the value of the data transmitted between the data provider 400-1 and the data buyer 400-2 may be determined in real-time based on various factors related to the data provider 400-1 and/or the data buyer 400-2, by invoking the data value calculating method in the first contract or the optional second contract signed between the data provider 400-1 and the data buyer 400-2.

Figure 5:
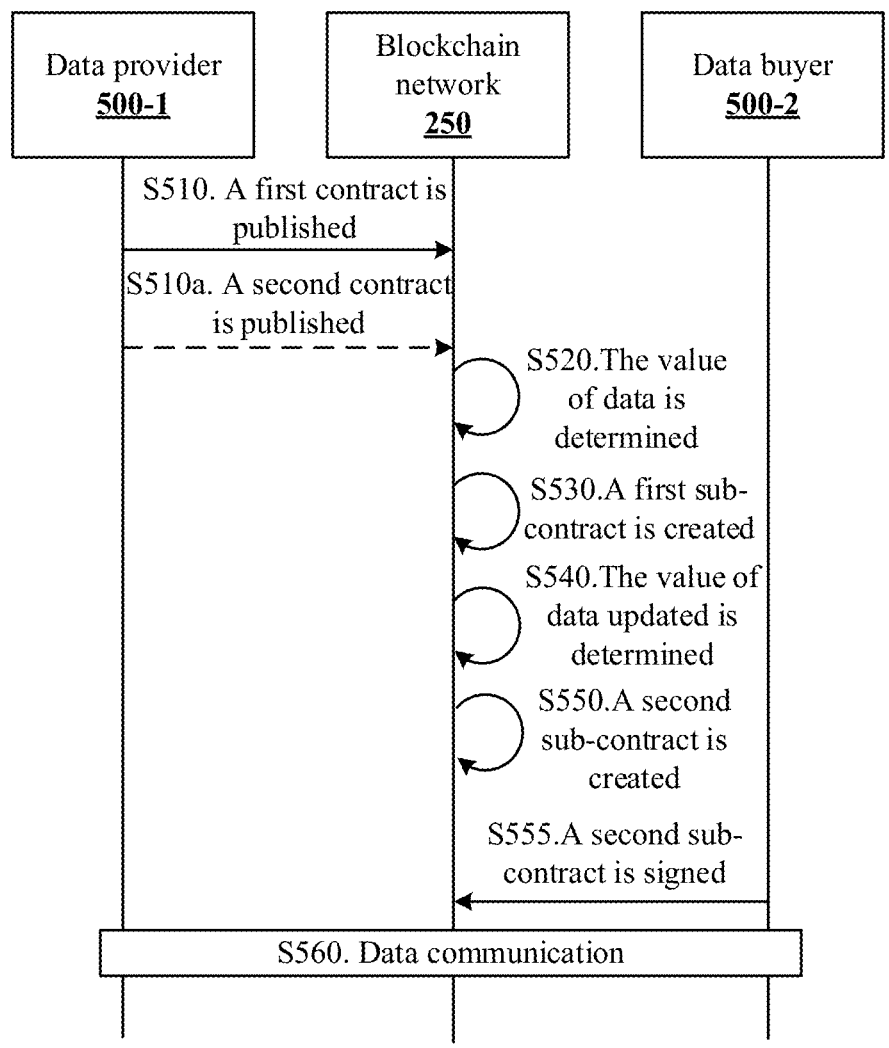
FIG. 5 is a schematic diagram illustrating a message flow of an example data transaction process according to another embodiment of the present disclosure.

FIG. 5 is a schematic diagram illustrating a message flow of an example data transaction process according to another embodiment of the present disclosure. The sequence of steps shown in FIG. 5 is exemplary only and not limiting. The various steps may be performed in a different order than that shown in FIG. 5 or in parallel, and optional steps may be omitted. Similar to FIG. 4, a data provider 500-1 shown in FIG. 5 may be any entity, company, etc. that may provide the data, such as but not limited to any one of the raw data providers 210-1 and 210-2, the label data providers 220-1 to 220-3, and the data model providers 230-1 and 230-2 described in FIG. 2, FIG. 3A and FIG. 3B. A data buyer 500-2 may be any entity, company, etc. that require the data, such as but not limited to any one of the raw data providers 210-1 and 210-2, the label data providers 220-1 to 220-3, and the data model providers 230-1 and 230-2 described in FIG. 2, FIG. 3A and FIG. 3B.

Steps S510 and S510a in FIG. 5 are similar to the steps S410 and S410a described in FIG. 4. The only difference is that the first contract in FIG. 5 may further include a contract creating method used to create a first sub-contract of the first contract. The first sub-contract may at least include a member variable that records an identifier of the first sub-contract. A relevant node/entity/device may acquire the first sub-contract through the member variable.

At step S520, similar to the step S420 described in FIG. 4, the blockchain network 250 calculates the data value in real-time by invoking the data value calculating method in the first contract or the second contract.

At step S530, the blockchain network 250 may invoke the contract creating method in the first contract to create the first sub-contract of the first contract in response to the change of the data value (e.g. by comparing the data value calculated at the step S520 with an original data value in the first contract), add the member variable that records the identifier of the first sub-contract to a sub-contract identifier of the first contract, and include the data value calculated at the step S520 in the first sub-contract. The first sub-contract may include the contract creating method, the data value calculating method, and the sub-contract identifier further created according to the contract creating method in the first sub-contract. In some embodiments, the first sub-contract may include the same member variables and member methods as the first contract. For example, the member variables and member methods that may be included in the first sub-contract are shown in Table 2 below.

TABLE 2

Member table for the example first sub-contract

| First Sub-contract Member | Description |
| --- | --- |
| Member Variable | Data type (e.g. raw data, label data and data model)<br>Contract identifier<br>Data provider identifier<br>Data address<br>Charging method<br>Original data value<br>Updated data value<br>Data accuracy<br>Period of updating the data value (optional)<br>Sub-contract identifier ///an identifier of a sub-contract created by invoking the contract creating method |
| Member Method | Data transmitting method( ) ///used to transmit the data between the data provider and the data buyer<br>Data value calculating method( ) ///calculating the data value in real-time<br>Contract creating method( ) ///used to create the sub-contract |

It should be noted that the member variables and the member methods in Table 2 are only examples. The first sub-contract may include fewer, more, or other member variables and member methods than those shown in Table 2.

Additionally or alternatively, in response to a period for updating the data value or an external event, the blockchain network 250 may invoke the data value calculating method in the first sub-contract to calculate the value of the data updated at step S540. The value of the data updated may be the same as or different from the value of the data calculated at the step S520. In a case that the value of the data updated is different from the value of the data calculated at the step S520, the blockchain network 250 may invoke the contract creating method in the first sub-contract at step S550 to create a second sub-contract, and include the updated data value calculated at step S530 in the second sub-contract. The second sub-contract may include member variables and member methods similar to the first sub-contract.

A process of specifically determining the data value in the steps S520 and S530 may be similar to the process shown in FIG. 4. Therefore, it is not repeated here.

It can be seen that the second sub-contract is a newly created sub-contract, which includes the latest value of the data. It should be understood that the steps of determining the value of the data updated and creating the sub-contract may be performed repeatedly in response to, for example, the period of updating the data value or the external event (e.g., a market change) until the latest sub-contract including the latest data value is created.

In the embodiment of FIG. 5, at step S555, the data buyer 500-2 signs the latest sub-contract (i.e. the second sub-contract).

At step S560, data communication is performed between the data provider 500-1 and the data buyer 500-2. The data communication may be achieved, for example, by invoking the data transmitting method in the first contract by the blockchain network 250.

In a case of data communication between the data provider and multiple data buyers, different data buyers may sign different contracts (e.g. the first contract, the first sub-contract, or the second sub-contract, etc.) according to the time when they need the data. For example, a first data buyer may have signed the first contract, and related data is processed according to the data value calculating method in the first contract. In a case that the blockchain network 250 has created the first sub-contract in response to, for example, the period of updating the data value or other external events, another data buyer with a data requirement may sign the first sub-contract and process related data according to the data value calculating method in the first contract. In this way, the blockchain network 250 may create different sub-contracts based on time and restrict the data communication between the data provider and the data buyer according to the sub-contracts.

Similar to the embodiment described with reference to FIG. 4, the embodiment of FIG. 5 may further include a corresponding step of contract termination.

Figure 6:
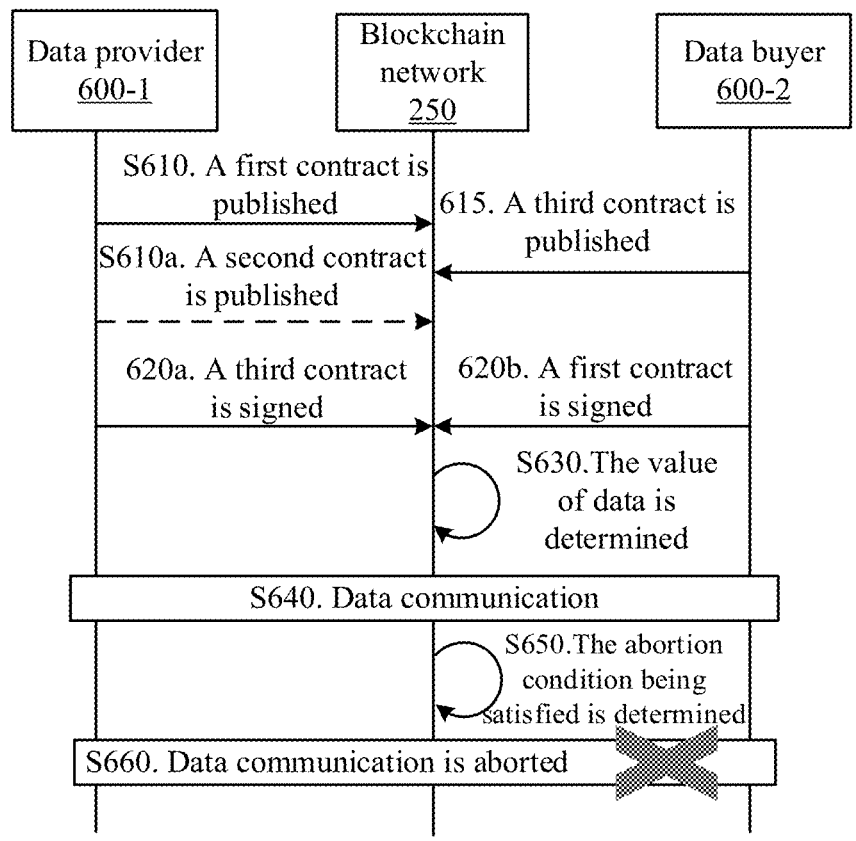
FIG. 6 is a schematic diagram illustrating a message flow of an example data transaction process according to another embodiment of the present disclosure.

FIG. 6 is a schematic diagram illustrating a message flow of an example data transaction process according to another embodiment of the present disclosure. The sequence of steps shown in FIG. 6 is exemplary only and not limiting. The various steps may be performed in a different order than that shown in FIG. 6 or in parallel, and optional steps may be omitted. A data provider 600-1 shown in FIG. 6 may be any entity, company, etc. that may provide the data, such as but not limited to any one of the raw data providers 210-1 and 210-2, the label data providers 220-1 to 220-3, and the data model providers 230-1 and 230-2 described in FIG. 2, FIG. 3A and FIG. 3B. A data buyer 600-2 may be any entity, company, etc. that require the data, such as but not limited to any one of the raw data providers 210-1 and 210-2, the label data providers 220-1 to 220-3, and the data model providers 230-1 and 230-2 described in FIG. 2, FIG. 3A and FIG. 3B.

At step S610, the data provider 600-1 may publish the first contract to the blockchain network 250. The first contract may be the first contract described with reference to the embodiment of FIG. 4, or the first contract described with reference to the embodiment of FIG. 5.

Optionally, at step S610a, the data provider 400-1 may publish the second contract, for example, the data value contract including the data value calculating method used to determine the value of the data, to the blockchain network 250. In this case, the first contract may not include the data value calculating method, but the data value contract triggering method. When the data value contract triggering method is triggered, it causes the data value contract to be executed to calculate the value of the data in real-time.

At step S615, the data buyer 600-2 publishes a third contract. The third contract may include a data verifying method used to verify the data transmitted between the data provider and the data buyer.

In steps S620a and S620b, the data provider 600-1 and the data buyer 600-2 may respectively sign the first contract and the third contract.

Although, in FIG. 6, the first contract and the optional second contract are shown as being provided by the data provider 600-1, and the third contract is shown as being provided by the data buyer 600-2, this disclosure is not limited thereto. It is described in this way to make the invention clearer. Those skilled in the art will readily understand that one or more of the first contract, the second contract and the third contract may alternatively be published by any one of the data provider 600-1 and the data buyer 600-2, and signed by the corresponding party.

In step S630, the blockchain network 250 invokes the data value calculating method in the first contract or the second contract to calculate the data value in real-time. The calculation of the data value may be performed in response to the event. For example, the event may be based on time or the specific external event, such as the period of updating the data price included in the first contract. When the period expires, the data price calculating method in the first contract is automatically triggered. The external event may be the specific event, such as the stock index greater than 3000 points, etc.

For a specific method for determining the data value, reference may be made to the method described in FIG. 4. Therefore, it is not repeated here.

At step S640, data communication is performed between the data provider 600-1 and the data buyer 600-2. The data communication may be achieved by, for example, invoking the data transmitting method in the first contract by the blockchain network 250.

When the data communication between the data provider 600-1 and the data buyer 600-2 is performed, the blockchain network 250 may invoke the data verifying method in the third contract to verify the data, so as to determine whether the data satisfies an abortion condition at step S650. For example, the abortion condition may be that the data accuracy is lower than a certain threshold, the data type is wrong, the data quality is lower than a certain threshold, the grade of the data provider 600-1 is lower than a certain threshold, and the like.

Step S650 may be performed by the blockchain network 250 automatically or in response to a request of any party.

In a case that it is determined that the abortion condition is satisfied, the blockchain network 250 may abort the data communication between the data provider 600-1 and the data buyer 600-2 at step S660. Additionally or alternatively, the blockchain network 250 may inform the respective parties of the reason for the abortion of communication.

By publishing the third contract used to verify the data in the blockchain network, the data communication may be aborted in time when it is detected that the data does not satisfy some conditions, thereby avoiding the waste of resources.

FIG. 7 is a flowchart illustrating a method 700 executed in an electronic device of the data provider according to an embodiment of the present disclosure.

The method 700 may include: at step S710, publishing a first contract to a blockchain network or signing a first contract published by a data receiver to the blockchain network, wherein the first contract includes a first method used to trigger transmission of data between a data transmitter signing the first contract and a data receiver signing the first contract, and a second method used to trigger determination of a value of the data.

The method 700 may further include: at step S720, transmitting the data to the data receiver according to the first contract.

In some embodiments, the first contract further includes a contract creating method, the contract creating method is used to create a first sub-contract of the first contract, and the first contract includes a member variable recording an identifier of the first sub-contract. In this embodiment, the method 700 may further include (not shown): creating, after the value calculating method is executed, the first sub-contract of the first contract by invoking the contract creating method, wherein the first sub-contract includes the value of the data updated after the value calculating method is executed.

Figure 8:
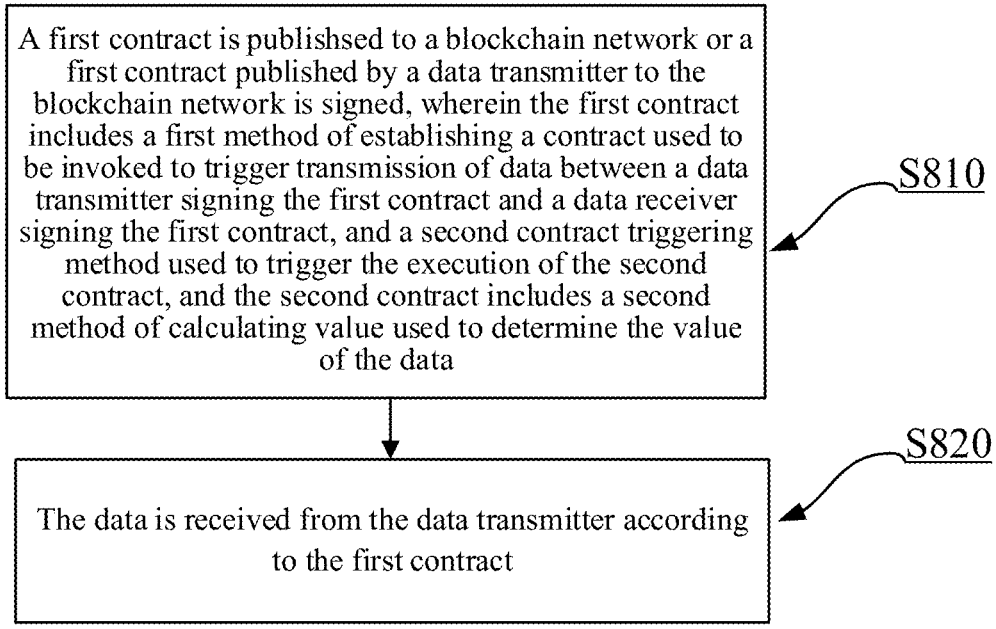
FIG. 8 is a flowchart illustrating another example method executed in an electronic device of a data receiver according to an embodiment of the present disclosure.

FIG. 8 is a flowchart illustrating a method 800 executed in an electronic device of the data receiver according to an embodiment of the present disclosure.

The method 800 may include: at step S810, publishing a first contract to a blockchain network or signing a first contract published by a data transmitter to the blockchain network, wherein the first contract includes a first method used to trigger transmission of data between a data transmitter signing the first contract and a data receiver signing the first contract, and a second method used to trigger determination of a value of the data.

The method 800 may further include: receiving the data from the data transmitter according to the first contract.

Figure 9:
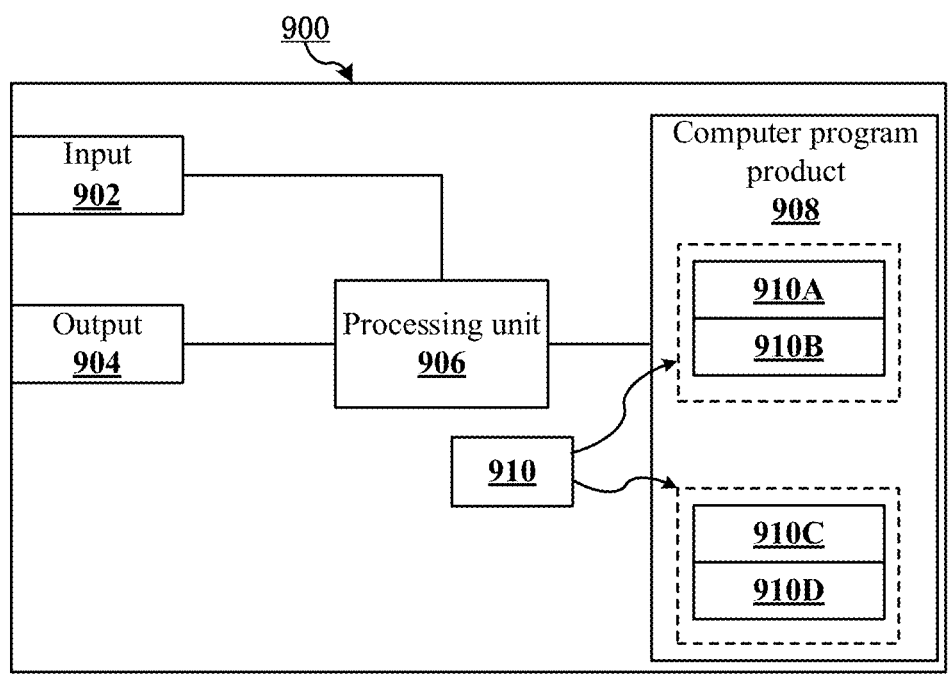
FIG. 9 is a schematic hardware layout diagram illustrating a device for data communication according to an embodiment of the present disclosure.

FIG. 9 is a schematic layout diagram illustrating a hardware of an electronic device 900 (e.g. an electronic device of any one of the party shown in FIG. 2 to FIG. 6) for data communication according to an embodiment of the present disclosure. A hardware layout 900 may include a processor or a controller 906 (e.g., a digital signal processor (DSP), a central processing unit (CPU), etc.). The processor 906 may be a single processing unit or multiple processing units for executing different actions of the processes described herein. The layout 900 may further include an input unit 902 used to receive signals from other entities, and an output unit 904 used to provide signals to other entities. The input unit 902 and the output unit 904 may be arranged as a single entity or as separate entities.

In addition, the layout 900 may include at least one readable storage medium 908 in a form of non-volatile or volatile memory, such as an electrically erasable programmable read only memory (EEPROM), a flash memory, and/or a hard drive. The readable storage medium 908 includes a computer program 910. The computer program 910 includes code/computer readable instructions which, when executed by the processor 909 in the layout 900, cause the hardware layout 900 and/or a device including the hardware layout 900 to perform e.g. the processes described above in conjunction with FIG. 4 to FIG. 6 and any variations thereof.

The computer program 910 may be used as a computer program code having, for example, the architecture of computer program modules 910A and 910B. Thus, in an example embodiment such as when the hardware layout 900 is used in the data provider, the code in the computer program of the layout 900 may include: the module 910A used to publish a first contract to a blockchain network or sign a first contract published by a data receiver to the blockchain network, wherein the first contract includes a first method used to trigger transmission of data between a data transmitter signing the first contract and a data receiver signing the first contract, and a second method used to trigger determination of a value of the data; the module 910B used to transmit the data to the data receiver according to the first contract.

In addition, in an example embodiment such as when the hardware layout 900 is used in the data buyer, the code in the computer program of the layout 900 may include: a module 910C used to publish a first contract to a blockchain network or sign a first contract published by a data transmitter to the blockchain network, wherein the first contract includes a first method used to trigger transmission of data between a data transmitter signing the first contract and a data receiver signing the first contract, and a second method used to trigger determination of a value of the data; and a module 910D used to receive the data from the data transmitter according to the first contract.

The computer program modules may substantially perform each of the actions in the flows shown in FIG. 4 to FIG. 6 to simulate the data provider and/or the data buyer. In other words, when different computer program modules are executed in the processor or controller 909, they may correspond to different units or modules in the simulated data provider and/or the data buyer.

Although the code means in the embodiments disclosed above in conjunction with FIG. 9 are implemented as computer program modules which, when executed in the processor 906, cause the hardware layout 900 to perform the actions described above in conjunction with FIG. 4 to FIG. 6, at least one of the code means may be implemented at least in part as a hardware circuit in an alternative embodiment.

The processor may be a single CPU (Central Processing Unit), but may further include two or more processing units. For example, the processor may include a general-purpose microprocessor, an instruction-set processor, and/or a related chipset and/or a special-purpose microprocessor (e.g., an application-specific integrated circuit (ASIC)). The processor may further include an onboard memory for caching purposes. The computer program may be carried by a computer program product connected to the processor. The computer program product may include a computer-readable medium having the computer program stored thereon. For example, the computer program product may be the flash memory, a random access memory (RAM), a read only memory (ROM), and an EEPROM. The computer program modules described above may be distributed in different computer program products in a form of the memory within the electronic device in the alternative embodiment.

The present disclosure has thus far been described in conjunction with some embodiments. It should be understood that various other changes, substitutions and additions may be made by those skilled in the art without departing from the spirit and scope of the present disclosure. Therefore, the scope of the present disclosure should not be limited to the specific embodiments described above, but should be defined by the appended claims.

What is claimed is:

1. A method for data communication executed at an electronic device of a data transmitter, comprising:
publishing a first contract to a blockchain network or signing a first contract published by a data receiver to the blockchain network, wherein the first contract comprises a first function configured to trigger transmission of data between a data transmitter signing the first contract and a data receiver signing the first contract, and a second function configured to trigger determination of a value of the data; and
transmitting the data to the data receiver according to the first contract,
wherein the second function is a value calculating function configured to determine the value of the data or a second contract triggering function configured to trigger an execution of a second contract, and the second contract comprises the value calculating function configured to determine the value of the data,
wherein the data is raw data, the first contract is a raw data contract, and the first function is a raw data acquiring function configured to trigger the data transmitter to transmit the raw data; and
wherein the value calculating function comprises:
adjusting the value of the raw data according to an accuracy of the raw data, including adjusting the value of the raw data by comparing a current data accuracy of the raw data with a reference data accuracy.

2. The method according to claim 1, wherein the second contract is published by the data transmitter or the data receiver to the blockchain network.

3. The method according to claim 1, wherein the first contract further comprises a contract creating function, the contract creating function is configured to create a first sub-contract of the first contract, and the first contract comprises a member variable recording an identifier of the first sub-contract.

4. The method according to claim 3, further comprising:
creating, after the value calculating function is executed, the first sub-contract of the first contract by invoking the contract creating function, wherein the first sub-contract comprises the value of the data updated after the value calculating function is executed.

5. The method according to claim 4, wherein the first sub-contract comprises a contract creating function and a value calculating function, the contract creating function of the first sub-contract is configured to create a second sub-contract, and the second sub-contract comprises an updated value of the data after the value calculating function of the first sub-contract is executed.

6. The method according to claim 1,
wherein the value calculating function further comprises adjusting the value of the raw data according to a quality of the raw data, and adjusting the value of the raw data according to the quality of the raw data comprises at least one of:
determining, by invoking a function for label data in a data label contract associated with the first contract, a consistency between the raw data and corresponding label data, so as to adjust the value of the raw data accordingly; or
invoking a function for starting the data model in the data model contract associated with the first contract to use the data model to calculate for the raw data to obtain result data, and determining a consistency between the raw data and the result, so as to adjust the value of the raw data accordingly.

7. A first electronic device used at the data transmitter, comprising:
a processor; and
a memory storing instructions, wherein the instructions, when executed by the processor, cause the first electronic device to implement the method according to claim 1.

8. A method for data communication executed at an electronic device of a data transmitter, comprising:
publishing a first contract to a blockchain network or signing a first contract published by a data receiver to the blockchain network, wherein the first contract comprises a first function configured to trigger transmission of data between a data transmitter signing the first contract and a data receiver signing the first contract, and a second function configured to trigger determination of a value of the data; and
transmitting the data to the data receiver according to the first contract,
wherein the second function is a value calculating function configured to determine the value of the data or a second contract triggering function configured to trigger an execution of a second contract, and the second contract comprises the value calculating function configured to determine the value of the data,
wherein the data is label data, the first contract is a data label contract, and the first function is a label data acquiring function configured to trigger the data transmitter to transmit the label data, and
wherein the value calculating function comprises at least one of:
adjusting the value of the label data according to a grade of a labeler of the label data, including adjusting the value of the label data by comparing a current grade of the labeler of the label data with a reference grade of the labeler;
adjusting the value of the label data according to a type of the label data, including adjusting the value of the label data by determining a semantic relationship between the label data and corresponding raw data; or
adjusting the value of the label data according to a quality of the label data, including invoking a function for starting the data model in the data model contract associated with the first contract to use the data model to calculate for the raw data corresponding to the label data to obtain result data, and determining a consistency between the label data and the result data, so as to adjust the value of the label data accordingly.

9. The method according to claim 8, wherein the second contract is published by the data transmitter or the data receiver to the blockchain network.

10. The method according to claim 8, wherein the first contract further comprises a contract creating function, the contract creating function is configured to create a first sub-contract of the first contract, and the first contract comprises a member variable recording an identifier of the first sub-contract.

11. The method according to claim 10, further comprising:

creating, after the value calculating function is executed, the first sub-contract of the first contract by invoking the contract creating function, wherein the first sub-contract comprises the value of the data updated after the value calculating function is executed.

12. The method according to claim 11, wherein the first sub-contract comprises a contract creating function and a value calculating function, the contract creating function of the first sub-contract is configured to create a second sub-contract, and the second sub-contract comprises an updated value of the data after the value calculating function of the first sub-contract is executed.

13. A first electronic device used at the data transmitter, comprising:
a processor; and
a memory storing instructions, wherein the instructions, when executed by the processor, cause the first electronic device to implement the method according to claim 8.

14. A method for data communication executed at an electronic device of a data transmitter, comprising:
publishing a first contract to a blockchain network or signing a first contract published by a data receiver to the blockchain network, wherein the first contract comprises a first function configured to trigger transmission of data between a data transmitter signing the first contract and a data receiver signing the first contract, and a second function configured to trigger determination of a value of the data; and
transmitting the data to the data receiver according to the first contract,
wherein the second function is a value calculating function configured to determine the value of the data or a second contract triggering function configured to trigger an execution of a second contract, and the second contract comprises the value calculating function configured to determine the value of the data,
wherein the data is a data model, the first contract is a data model contract, and the first function is a data model acquiring function configured to trigger the data transmitter to transmit the data model or a function for starting the data model, and
wherein:
the value calculating function comprises adjusting the value of the data model by comparing a current model accuracy of the data model with a reference model accuracy, and/or
the value calculating function comprises:
acquiring the raw data by invoking a function for acquiring data of the raw data contract corresponding to the first contract;
acquiring the label data corresponding to the raw data by invoking a function for label data of the data label contract corresponding to the first contract;
calculating by using the data model for the raw data to obtain result data;
determining a model accuracy of the data model by comparing the result data with the label data; and
adjusting the value of the data model according to the model accuracy of the data model.

15. The method according to claim 14, wherein the second contract is published by the data transmitter or the data receiver to the blockchain network.

16. The method according to claim 14, wherein the first contract further comprises a contract creating function, the contract creating function is configured to create a first sub-contract of the first contract, and the first contract comprises a member variable recording an identifier of the first sub-contract.

17. The method according to claim 16, further comprising:
creating, after the value calculating function is executed, the first sub-contract of the first contract by invoking the contract creating function, wherein the first sub-contract comprises the value of the data updated after the value calculating function is executed.

18. The method according to claim 17, wherein the first sub-contract comprises a contract creating function and a value calculating function, the contract creating function of the first sub-contract is configured to create a second sub-contract, and the second sub-contract comprises an updated value of the data after the value calculating function of the first sub-contract is executed.

19. A first electronic device used at the data transmitter, comprising:
a processor; and
a memory storing instructions, wherein the instructions, when executed by the processor, cause the first electronic device to implement the method according to claim 14.

* * * * *